UNITED STATES PATENT OFFICE.

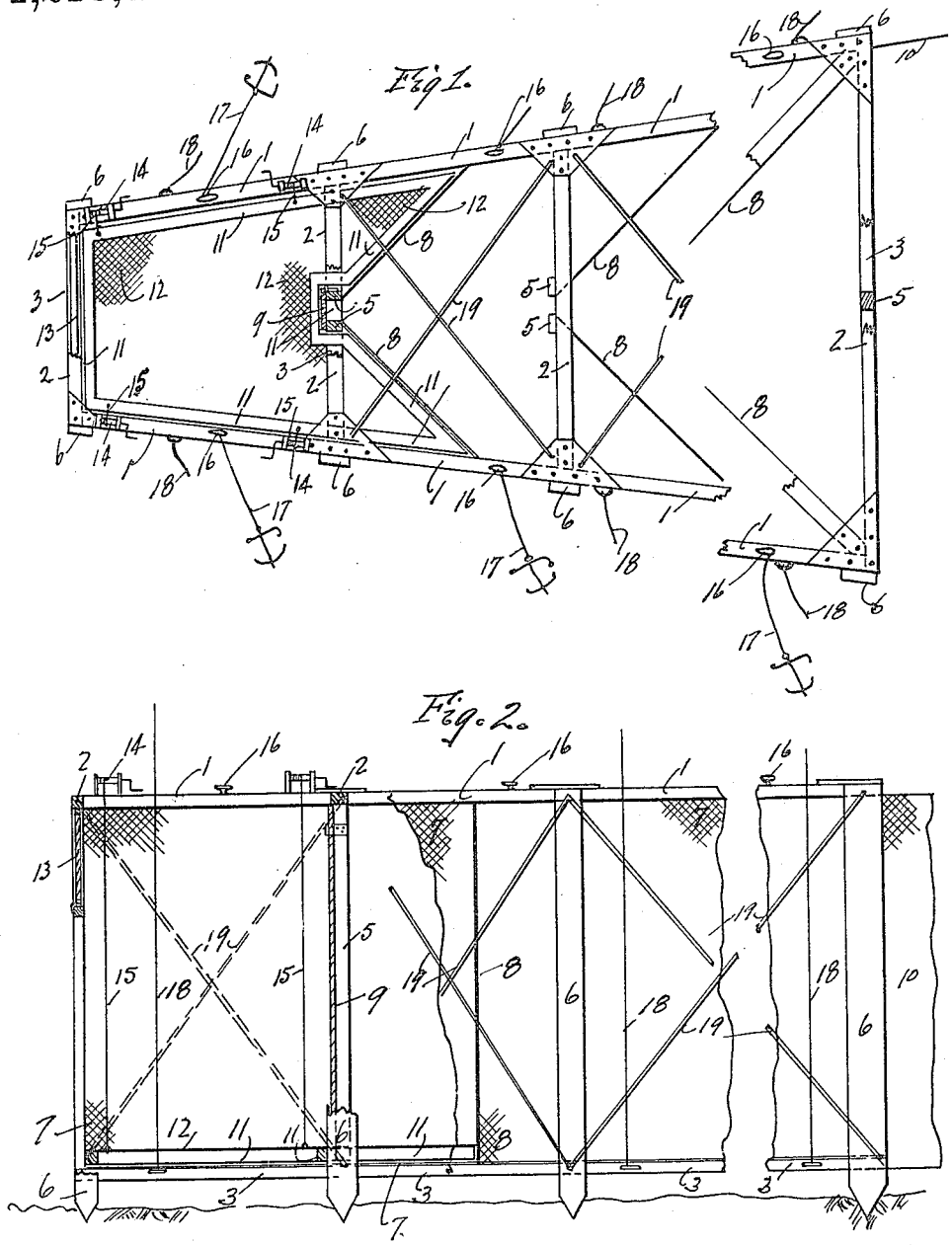

HANS CHRISTENSEN, OF BROWNSVILLE, WASHINGTON.

PORTABLE FISH-TRAP.

1,213,459.

Specification of Letters Patent.

Patented Jan. 23, 1917.

Application filed April 14, 1915. Serial No. 21,217.

*To all whom it may concern:*

Be it known that I, HANS CHRISTENSEN, a citizen of the United States, and a resident of Brownsville, in the county of Kitsap and State of Washington, have invented certain new and useful Improvements in Portable Fish-Traps, of which the following is a full, true, and exact specification.

My invention relates to improvements in portable fish traps and has for its principal object: to provide a novel device of the above generally described character which will possess the general advantages of either a permanently located trap or a floating trap and which does not possess the usual disadvantages of either such as liability to being pulled up by the tide or blown away by the wind.

A further object is to provide a trap which sinks and rests upon the bottom of the sea and is adapted to be emptied without the necessity of bailing as is usual in the art and to provide a means of releasing without injury thereto any fish which it is not desirable to take, also to provide a means for preventing the escape of entrapped fish and to prevent loss of fish while emptying the traps.

Other objects will appear as my invention is more fully explained in the following specification, illustrated in the accompanying drawings and pointed out in the appended claim.

In the drawings, Figure 1 is a plan view of my device with parts broken away. Fig. 2 is a side elevation of same.

Referring more particularly to the drawings, numeral 1 designates upper caps, 2 top cross beams between the said caps, 3 indicates sills, 4 bottom cross beams and 5 intermediate vertical columns. The caps and sills may be in one length or in sections as desired. When the entire trap is large as in the case of a Pacific Coast salmon trap, it is desirable to build the trap in sections and bolt them together as in this form, they are more easily assembled, raised and repaired, and any number of sections may be bolted together either vertically to suit the depth of water or horizontally to suit the desired length of trap. Mooring piles 6 are secured to the outside of the frame of the trap, which are formed of the members previously described when rigidly joined together, and project slightly below the bottom of sills 3 so as to stick into the mud of the bottom of the sea. The piles are not to be driven into the mud as ordinary piles. The frame as described is covered, except the top and larger end, with webbing or netting 7. Heart sides 8 also of webbing, are stretched from the bottom of the trap to the top and at an angle with the sides of the trap. The sides 8 are arranged in pairs as shown and together form what is commonly called a heart. The hearts are open at the point. The innermost heart has its opening closable by a hinged door 9. A wing or lead 10 is attached to the rear end of the trap and reaches to the shore. The purpose of the lead is to intercept and guide the fish into the trap. The forward compartment or pot of the trap is provided with a false or movable bottom which is composed of structural members 11 which fit the interior of the pot closely. The members 11 are covered with a webbing 12. The rear end of the trap is provided with a door 13 which is adapted to swing outwardly. Winches or hoisting drums 14 are provided on the top of the trap and are adapted to wind up lines 15 which are attached to the false bottom and thus raise the said bottom with respect to the rest of the trap. Before raising the bottom, the door 9 is closed, a scow is brought alongside the end of the trap and the door 13 is opened so as to allow the fish which are raised by the false bottom to be dumped from the trap into the scow. Any fish which it is desired to release are also dumped back into the water outside the traps by the same method.

Cleats 16 are provided along the top of the trap and are used to tie mooring anchor lines 17. Lifting lines 18 are attached to the bottom sills and are used in raising the trap, when it is desired to move it from place to place or to take it up at the end of a fishing season. The preferable method of moving is to tie the lines to scows one on either side of the trap at low tide and allow the rising tide to lift the scows and trap which is then easily towed to a new location.

My trap is made of metal or other heavier than water material which will cause it to sink and is made of strong and permanent construction. Tie rods 19 may be used to stiffen the frame. It will be understood that the salmon traps of the Pacific Coast are redriven each season and are frequently torn out by the tide or a storm and are not easily replaced in time to catch fish that season. Also the bottom of the sea is frequently of rock and piles cannot be driven in the best locations. My trap is particularly well adapted for use in such locations as it is self contained, portable, rests on the bottom, offers little resistance to tide, is easily cleaned of sea weed and the like and may be taken on shore for repairs or storage for another season's use.

A trap already constructed has demonstrated all of the above mentioned advantages and has overcome the disadvantages.

While I have shown a particular form of embodiment of my invention, I am aware that many minor changes therein will readily suggest themselves to others skilled in the art without departing from the spirit and scope of the invention, and I therefore, desire to avoid being limited to the exact form shown and described, except as pointed out in the appended claim.

Having described my invention, what I claim as new and desire to protect by Letters Patent, is—

In a portable fish trap which normally rests upon the bottom of the sea, the combination of a rigidly connected outer framework, webbing secured to the said framework and members dividing the trap into inner and outer compartments, the former being adapted to inclose fish and the latter to guide the fish into the inner compartment, a door separating the inner and outer compartments, a false bottom within the inner compartment and fitting the sides of said compartment closely, means for raising the said false bottom with respect to the rest of the trap, said means including windlasses on top of the trap framework and lines attached to the false bottom and adapted to be wound upon the windlasses, a door in the inner compartment near the top of the trap and communicating with the outside of the trap, whereby the captured fish may be more easily removed from the trap and whereby they may be released from the trap into the open sea, means for securing the trap to the bottom of the sea, said means including anchors secured to the top of the trap by lines and piles projecting a short distance below the bottom of the trap, and means for raising the entire trap, whereby it may be moved from place to place.

HANS CHRISTENSEN.

Witnesses:
FRANK H. FOWLER,
WINIFRED KNOPH.

Copies of this patent may be obtained for five cents each, by addressing the "Commissioner of Patents, Washington, D. C."